US006075988A

United States Patent [19]
Anderson et al.

[11] Patent Number: 6,075,988
[45] Date of Patent: Jun. 13, 2000

[54] PAGING PERFORMANCE DURING INTELLIGENT ROAMING

[75] Inventors: Keith W. Anderson, Durham; Carl B. Toot, Jr., Raleigh, both of N.C.

[73] Assignee: Ericsson Inc., Research Triangle Park, N.C.

[21] Appl. No.: 08/992,881

[22] Filed: Dec. 18, 1997

[51] Int. Cl.[7] .................................................. H04B 15/00
[52] U.S. Cl. .......................... 455/434; 455/515; 455/62; 455/161.1
[58] Field of Search ..................................... 455/434, 455, 455/515, 62, 161.1–161.3, 166.2, 179.1, 432, 436, 422

[56] References Cited

U.S. PATENT DOCUMENTS

| | | | |
|---|---|---|---|
| 5,586,338 | 12/1996 | Lynch et al. | 455/434 |
| 5,711,001 | 1/1998 | Bussan et al. | 455/161.3 |
| 5,903,839 | 5/1999 | Mattila | 455/434 |

OTHER PUBLICATIONS

Appendix M — "Intelligent Roaming Requirements for PCS Phones" — AT&T Wireless Services, Inc., ES–4019 Rev. 2.3 Nov. 1, 1996.

"Intelligent Roaming" — SBC Communications, Inc. and BellSouth Cellular Corporation, RF45.3.6/97.06.11.18 Digital Cellular Standards.

*Primary Examiner*—Doris H. To
*Attorney, Agent, or Firm*—Wood, Phillips, VanSanten, Clark & Mortimer

[57] ABSTRACT

Disclosed herein is the method of operating a cellular mobile station to identify a suitable cellular control channel for entering a camping state with a highest priority cellular service provider, based on data stored in the cellular mobile station, that is preferred to a current cellular control channel the mobile station is camping on. The method comprising the steps of: (a) measuring received signal strength of a plurality of available cellular control channels; (b) attempting to lock onto the available cellular control channels having highest signal strength; (c) determining if a locked onto cellular control channel is a highest priority cellular control channel and, if so, then camping on that cellular control channel, and otherwise returning to camping on the current control channel; and (d) periodically interrupting any of steps (a)–(c) to receive control data from the current cellular control channel and then returning to the interrupted step.

14 Claims, 4 Drawing Sheets

PAGING PERFORMANCE DURING INTELLIGENT ROAMING

FIELD OF THE INVENTION

This invention relates to intelligent roaming requirements for cellular mobile stations and, more particularly, to a method of re-scanning for an acceptable service provider.

BACKGROUND OF THE INVENTION

Cellular phone systems permit the user of a mobile station to travel extensively and still retain access to cellular phone service. The mobile station is programmable and includes a number-assignment module (NAM) and an intelligent roaming database (IRDB). The NAM is programmable memory containing information about the mobile station such as electronic serial number, phone number, paging channels, etc. The IRDB contains information elements that the mobile station uses during scanning operations.

Advantageously, the user accesses a home service provider. The home service provider is the entity to which the user subscribes for service. Depending on the user's location, access to the home service provider may not be available or the signal may not be of sufficient strength. Additional service providers are categorized as partners, favored, neutral, or forbidden. A partner service provider is one which the home service provider has negotiated for superior subscriber services and rates. A favored service provider is similar to a partner except the service area of the favored service provider overlaps the service area of the home service provider. A neutral service provider is neither home, partner, favored, nor forbidden. In other words, there is no match with the IRDB in the mobile station or the NAM. A forbidden service provider is one that should never be used, with the exception of 911 service. The categories of service providers take precedence in the following order: home, partner, favored, neutral.

The mobile station prefers to camp on a home or partner service provider. These are known as "acceptable". A mobile station is also allowed to camp on a favored or neutral service provider. These are termed "unacceptable". When a mobile station is powered up, it immediately starts scanning for control channels to camp on. If the mobile station can only locate favored or neutral service providers, it will camp on one of these. When a mobile station camps on an unacceptable service provider, it periodically leaves that channel and searches for an acceptable service provider. The act of leaving a current control channel and scanning for others will degrade the paging performance. Particularly, the re-scanning procedure is made up of several steps which are repeated until an acceptable channel is found or all of the bands that the mobile station can scan are exhausted. When camping on a control channel, the mobile station must read 20 milliseconds of data from the current service provider every 1.28 seconds, defining a hyperframe. The operation of the station for the remaining 1.26 seconds is left up to the manufacturer. In general, the mobile station enters a low power state during this period when no data is needed.

Paging information from the current control channel arrives during the 20 millisecond time period. Once most mobile stations start the re-scanning procedure, they continue until the process has been completed. This process takes more than 1.26 seconds, causing the mobile station to miss pages. In fact, a reasonable time estimate for this procedure is on the order of 15 seconds to one minute. A phone is unable to receive pages while performing the re-scanning procedure in this manner.

The present invention is directed to overcoming one or more of the problems discussed above in a novel and simple manner.

SUMMARY OF THE INVENTION

In accordance with the invention there is disclosed a method of operating a cellular mobile station to identify a suitable cellular control channel which periodically interrupts re-scanning to receive control data from the current cellular control channel.

Broadly, there is disclosed herein the method of operating a cellular mobile station to identify a suitable cellular control channel for entering a camping state with a highest priority cellular service provider, based on data stored in the cellular mobile station, that is preferred to a current cellular control channel the mobile station is camping on. The method comprising the steps of: (a) measuring received signal strength of a plurality of available cellular control channels; (b) attempting to lock onto the available cellular control channels having highest signal strength; (c) determining if a locked onto cellular control channel is a highest priority cellular control channel and, if so, then camping on that cellular control channel, and otherwise returning to camping on the current control channel; and (d) periodically interrupting any of steps (a)–(c) to receive control data from the current cellular control channel and then returning to the interrupted step.

It is a feature of the invention that step (d) includes the step of calculating available time T until control data will next be received, upon returning to the interrupted step.

It is another feature of the invention wherein each of steps (a)–(c) continues until available time T has been reached and then interrupts or until the respective step is completed.

It is a further feature of the invention that the interrupting step comprises determining how many of the available control channels can be measured in the available time T and measuring the received signal strength for the determined number of control channels.

It is still a further feature of the invention that the interrupting step comprises determining how much time T2 is available to attempt to lock onto a cellular control channel and attempting to lock onto the highest signal strength cellular control channel for the time T2.

It is still another feature of the invention that the interrupting step comprises determining how much time T3 is available to determine if a locked onto cellular control channel is a highest priority cellular control channel and reading overhead information on the locked onto cellular control channel for that time T3.

It is still a further feature of the invention wherein normal cellular control activities are defined by a hyperframe of a select time period and the control data is received during a select portion of the time period, wherein steps (a)–(c) are interrupted prior to the select portion of the time period.

There is disclosed in accordance with another aspect of the invention an intelligent roaming program in a cellular mobile station having a processor operable to identify a suitable cellular control channel for entering a camping state with a highest priority cellular service provider, based on data stored in the cellular mobile station, that is preferred to a current cellular control channel the mobile station is camping on. The intelligent roaming program includes means for measuring received signal strength of a plurality of available cellular control channels. Means attempt to lock onto the available cellular control channel having the highest signal strength. Means determine if a locked onto cellular control channel is a highest priority cellular control channel, and if so, then camping on that cellular control channel, and otherwise returning to camping on the current control channel. Interrupt means periodically interrupt operation of any of the measuring means, the attempting means, or the determining means to receive control data from the current cellular control channel and then returning to the interrupted operation.

Further features and advantages of the invention will be readily apparent from the specification and from the drawings.

DETAILED DESCRIPTION OF THE INVENTION

Figure 1:
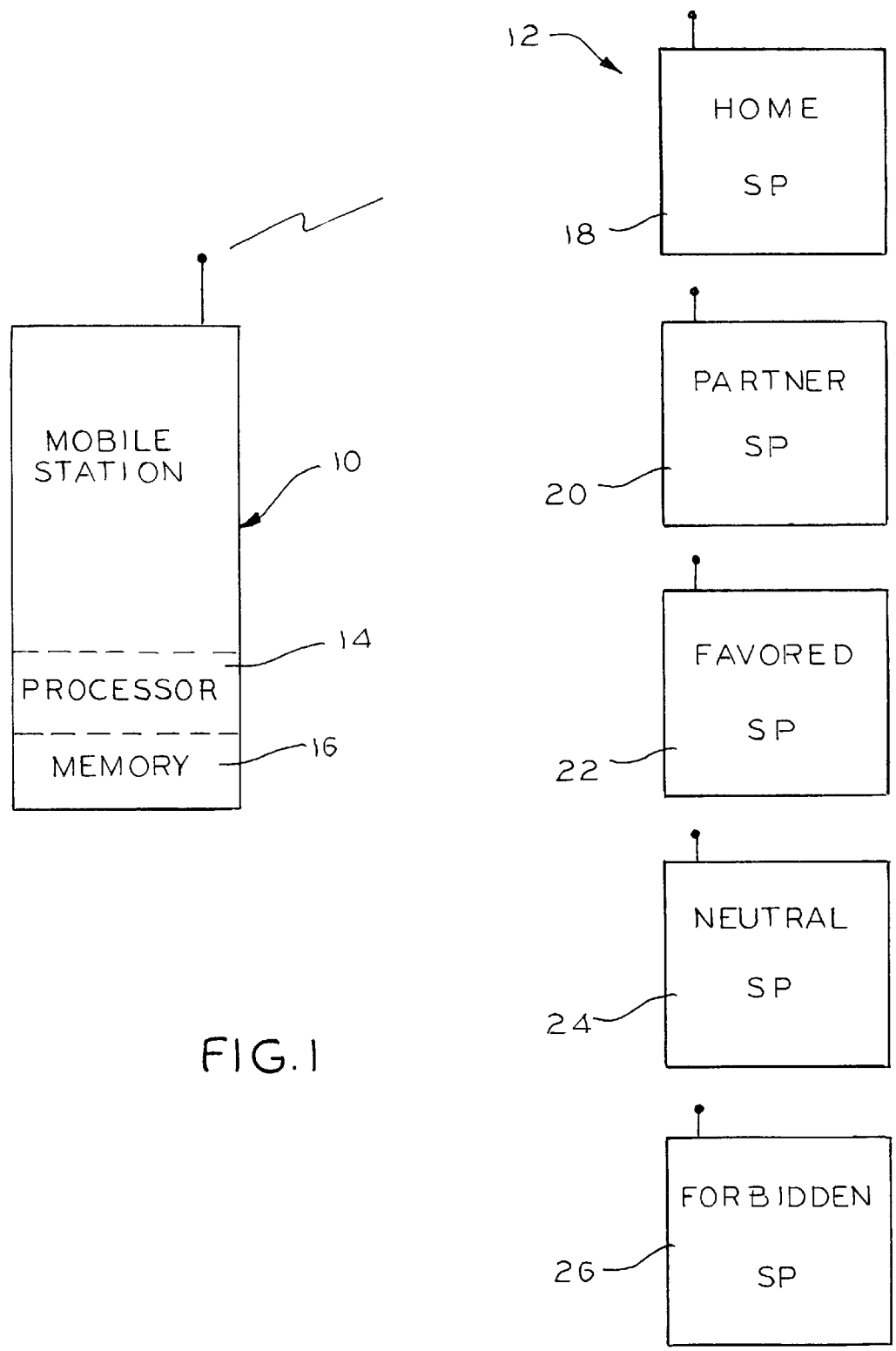
FIG. 1 is a generalized block diagram of a mobile station implementing an intelligent roaming method according to the invention.

Referring to FIG. 1, a generalized block diagram illustrates a cellular mobile station 10 programmed to provide improved performance during intelligent roaming for one of a plurality of base stations or service providers 12 in a given geographic area.

The mobile station 10 includes a cellular telephone of generally conventional construction including a processor 14 and associated memory 16. The mobile station 10 can take any known form to provide desired service. The invention herein relates specifically to improved paging performance during intelligent roaming. Therefore, the specification herein is directed specifically to that aspect of the invention. This improved paging performance can be implemented in virtually any cellular mobile station. Therefore, the details of the mobile station are not disclosed in detail herein.

Intelligent roaming is the process by which the mobile station 10 searches for one of the base stations 12 to camp on. The basic specification for intelligent roaming, entitled "Intelligent Roaming Requirements for PCS Phones", was written by AT&T Wireless Services, Inc. in an attempt to help mobile stations find an acceptable base station as quickly as possible.

The mobile station is programmable and includes a number-assignment module (NAM) and an intelligent roaming database (IRDB). The NAM is programmable memory containing information about the mobile station such as electronic serial number, phone number, paging channels, etc. The IRDB contains information elements that the mobile station uses during scanning operations During intelligent roaming the mobile station attempts to assure that it is receiving the best possible service at any location. The service provider, or base station, 12 is a carrier that is recognized by its system identity (SID) or its system operator code (SOC). These are used by a mobile station 10, using information in the IRDB to acquire or reject the services offered by specific service providers 12. In most cases the mobile station 10 acquires a service by matching its SOC or SID. A service provider 12 is either home 18, partner 20, favored 22, neutral 24, or forbidden 26, as discussed above. The home service provider is always considered acceptable. In some instances the partner service provider is also considered acceptable. The favored, neutral and forbidden service providers are always considered unacceptable.

A channel consists of a pair of frequencies used by a mobile station. One is a send frequency. The other is a receive frequency. Some of the channels within each service band are dedicated to the control of the mobile station. These are digital control channels (DCCH) or analog control channels (ACC). The control channels perform system control functions. The remaining channels in a band are used for voice and data communications and are called traffic channels.

Upon power-up, a mobile station 10 immediately scans for a control channel to camp on. Once the mobile station 10 is camped on a particular service provider, then it can originate a call or accept a call. To accept a call, the mobile station is "paged" as by receiving a PCH message on the current control channel.

Figure 2:
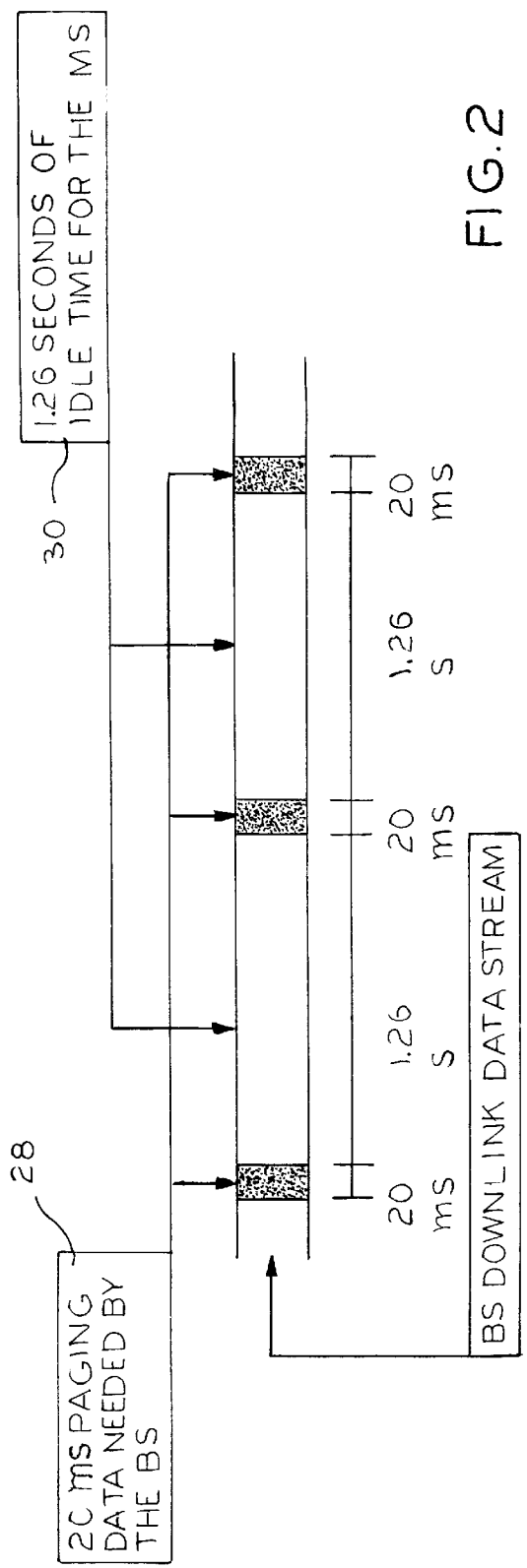
FIG. 2 is a timing diagram illustrating a hyperframe during which cellular control activities occur.

When camping on a DCCH, the mobile station 10 must read 20 milliseconds of data from the current control channel, i.e., the service provider camped on, every 1.28 seconds, as illustrated in FIG. 2. This 1.28 second time period is referred to as a hyperframe. There are times when the mobile station 10 must read more data than this. Paging data is included in the data to be read. This 20 millisecond time period is noted by bursts of data at a block 28 in FIG. 2. The operation of the mobile station 10 for the remaining 1.26 seconds of the hyperframe, noted at a block 30, is idle time and is left up to the manufacturer of the mobile station 10. In general, the mobile station 10 will enter a low power state during this idle time when no data is needed.

When a mobile station 10 camps on an unacceptable service provider, it periodically leaves that control channel and searches for an acceptable service provider, such as the home service provider 18 or the partner service provider 20. In accordance with the invention the re-scanning procedure takes place only during the idle time 30, see FIG. 2, so that no paging information is missed. Particularly, the re-scanning procedure is broken up into time slices that are fitted between the bursts of data 28 that are required by the mobile station 10. The mobile station 10 can store information, such as frequency, timing, overhead information, etc. about the current channel it is camping on in the memory 16 so that when it returns to the current channel to check its paging information, it can act as if it had never left. The re-scanning procedure is broken up into portions that are each less than 1.26 seconds. If any portion of the re-scanning procedure cannot be finished in its 1.26 second time slice, it is aborted and the mobile station 10 returns to the current control channel in order to read its paging information. At the next 1.26 second time slice, the aborted portion of the re-scan procedure can be restarted or picked up from where it left off.

Figure 3A:
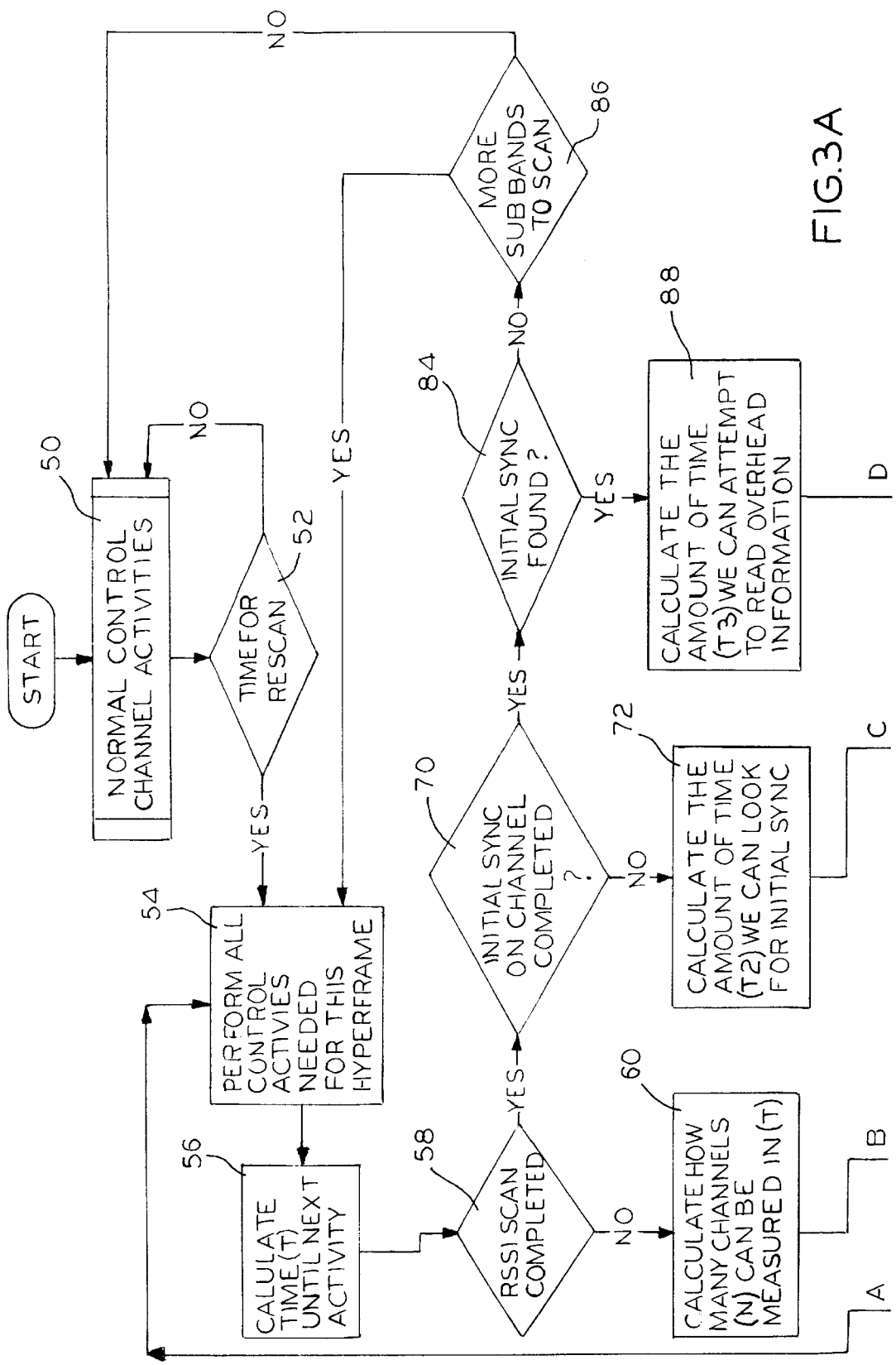
FIGS. 3A and 3B is a flow diagram illustrating operation of the re-scanning procedure to the mobile station of FIG. 1.
Figure 3B:
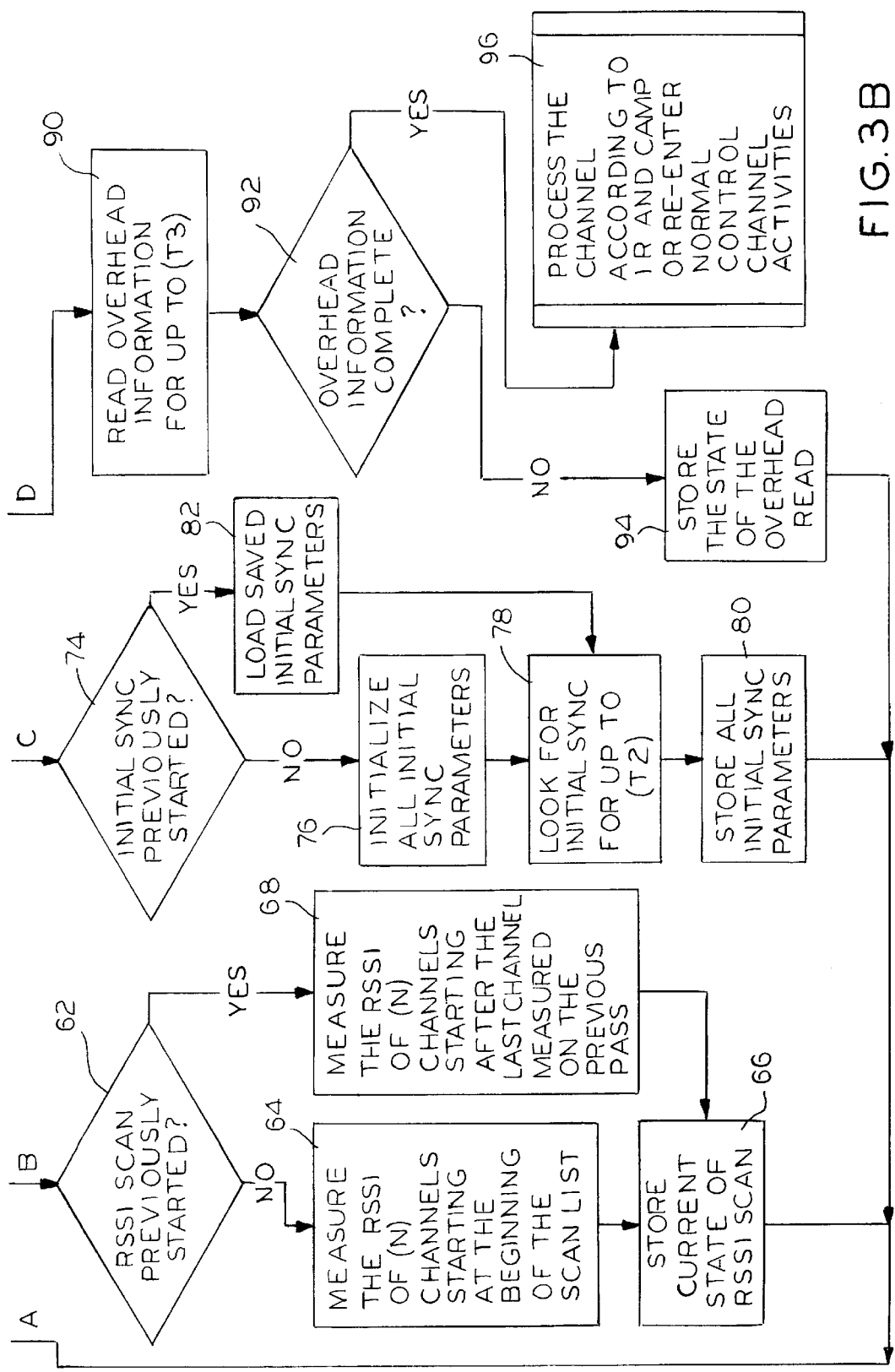

Referring to FIGS. 3A and 3B, a flow diagram illustrates the intelligent roaming program implemented by the processor 14 of FIG. 1 for the re-scanning procedure in accordance with the invention. Subsequent to start-up, the mobile station 10 performs normal control channel activities at a block 50. This can include the scanning for the initial control channel to camp on. Subsequently, a decision block 52 determines if it is time for a re-scan. A re-scan is necessary if the mobile station 10 is camped on an unacceptable base station, such as a favored service provider 22, a neutral service provider 24, or in some instances, a partner service provider 20, as discussed above. Also, the re-scan is only performed at preselect time-out intervals. For example, the re-scan procedure can occur as often as every 300 hyperframes, i.e., 384 seconds. If it is not time for a re-scan, then control returns to the block 50.

Once it is necessary to perform a re-scan, as determined at the decision block 52, a block 54 performs all control activities needed for the current hyperframe. This consists of reading the downlinked data stream from the current control channel during the 20 millisecond time period 28. A block 56 then calculates the time T until the next burst of data during a time period 28 when control activities must again be performed. This is the remaining available time within the hyperframe.

During the re-scanning procedure, the mobile station 10 determines the received signal strength indication (RSSI) of a large number of channels. Several channels are picked as the best candidates, and the mobile station attempts to lock onto these channels by synchronizing with the channels. After locking on, the mobile station 10 reads the overhead information of the control channel and determines whether or not it is an acceptable service provider.

A decision block 58 determines if the RSSI scan is completed. If not, the a block 60 calculates how many control channels N can be measured in available time T. A decision block 62 then determines if an RSSI scan was previously started. If not, a block 64 measures the RSSI of N channels starting at the beginning of the scan list. The current state of the RSSI scan is then stored at a block 66 and control returns to the block 54 to conclude the hyperframe. If the RSSI scan was previously started, as determined at the decision block 62, then a block 68 measures the RSSI of N channels starting after the last channel measured on the previous pass. Control then returns to the block 66. Thus, the blocks 60–68 are used to measure signal strength on a select number of available channels, such as 80 channels.

Once the RSSI scan has been completed, as determined at the decision block 58, then control proceeds to a decision block 70 which determines if an initial sync on channel has been completed. The program looks for initial sync in order to determine if the mobile station 10 can lock onto a select number of channels having the highest RSSI. If not, a block 72 calculates the amount of time T2 that can be spent looking for initial sync. This is typically the remaining 1.26 seconds, but might be lower due to other restrictions. A decision block 74 determines if initial synch was previously started. If not, then all initial sync parameters are initialized at a block 76. The program looks for initial sync for up to the available time T2 at a block 78. All initial sync parameters are then stored at a block 80 and control returns to the block 54. In subsequent passes, if the initial sync was previously started, as determined at decision block 74, then the saved initial sync parameters are loaded at a block 82. The program then continues with the block 78 to look for the initial sync.

Once the initial sync on channel, as determined at the decision block 70, has been completed, then the program proceeds to a decision block 84 to determine if initial sync was found. Initial sync is found if the mobile station 10 is successful in locking onto one or more of the channels. If not, then the mobile station 10 determines if there are more sub-bands to scan at a decision block 86. If not, then the program returns to the block 50 and remains on the current control channel. In other words, the mobile station 10 will continue to camp on the unacceptable service provider. If there are more sub-bands to scan, then control returns to the block 54 to continue the re-scanning procedure.

If initial sync was found, as determined at the decision block 84, then the block 88 calculates the amount of time T3 available to attempt to read overhead information. Again, this is normally the 1.26 seconds of idle time. A block 90 reads overhead information for the locked on channel or channels. A decision block 92 determines if the reading operation is complete. If not, the state of the overhead read is stored at a block 94 and control returns to the block 54 to wait for the next time slice. Once the overhead read is complete, as determined at the decision block 92, then the system processes the channels according to intelligent roaming and camps on one if the service provider is an acceptable service provider or re-enters normal control channel activities as by returning to the current control channel if not, at a block 96. The re-scanning procedure is then completed. However, as discussed above, if the result is that the mobile station 10 continues to camp on an unacceptable service provider, then the re-scan procedure will be reimplemented at the next time out.

Thus, by using the re-scanning procedure, the mobile station 10 will repeatedly attempt to camp onto a higher priority service provider until such time as it is camped on an acceptable service provider.

Because the re-scan procedure is broken up into time slices, it is necessary to store information about the channels being investigated. While performing the RSSI scan, the stored information includes the list of channels to be scanned, data on which channels have and have not already been scanned, and the measurements from those channels which have already been scanned. While performing initial sync, the stored information includes exact frequency, exact frame timing, and any information already learned about the channel, like whether it appears to be full rate or half rate, and which hyperframe is currently being transmitted by the service provider. While reading overhead information, the information being stored includes exact frequency, exact frame timing, and any information already learned about the channel such as whether it appears to be full rate or half rate. Also stored is information on which hyperframe is currently being transmitted by the service provider and the current state of the overhead read in layer 2 or layer 3.

Figure 4:
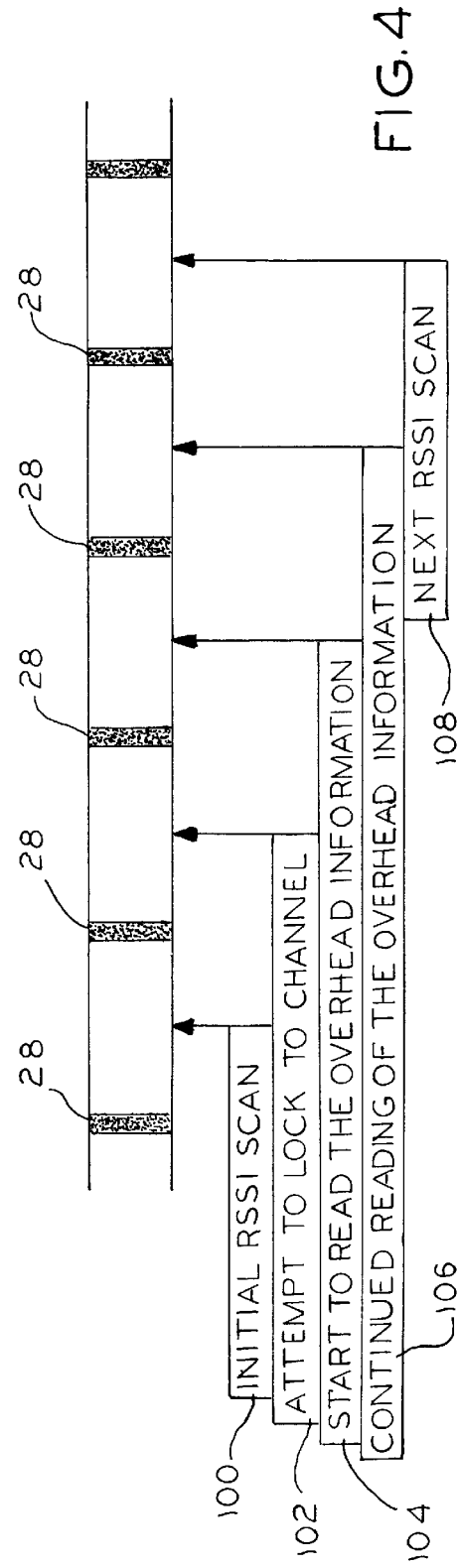
FIG. 4 is a timing diagram similar to FIG. 2 illustrating operation of the flow diagram of FIGS. 3A and 3B.

FIG. 4 illustrates how the re-scan procedure is broken up into plural time slices. The bursts of control data are represented by the blackened pulses 28. During a first time slice 100 an initial RSSI scan is performed. During a second time slice 102 an attempt is made to lock onto a channel. During a third time slice 104 the program starts to read the overhead information. Continued reading of the overhead information occurs during a fourth time slice 106. Assuming an acceptable service provider was not found, the next RSSI scan continues during the fifth time slice 108. The re-scanning procedure would then continue as described with the flow diagram of FIGS. 3A and 3B.

Performance improvement using the re-scanning procedure will be apparent based on the following illustration. The re-scan procedure can occur as often as 300 hyperframes or 384 seconds. During the re-scan procedure it may be necessary to measure the RSSI in seven sub-bands. It takes approximately 1.5 seconds per sub-band, for a total of 10.5 seconds. It may also be necessary to look for overhead information in up to two channels for each sub-band. This can take up to five seconds before a determination is made that the channel does not exist or there is too much interference to read the overhead information. This takes approximately ten seconds per sub-band, for a total of seventy seconds. Thus, a conventional re-scan procedure can take up to 80.5 seconds of the 384 seconds to yield a 21% paging degradation in the worst case scenario for a partial scan. The AT&T Wireless specification for intelligent roaming indicates that the time required for the partial scan should be ten seconds or less. This would still cause a 2.5% degradation in paging performance (10/384), which in a good environment would be the largest source of missed pages.

The PCH degradation is even worse because after every fourth partial scan the mobile station will perform a wide band scan. The wide band scan takes up to eight times as long as the partial scan. This can lead to a 50.3% degradation in paging performance. Even using the time limit of ten seconds to scan a band, the paging performance is degraded by 6.25%.

By using the described re-scanning procedure, there is no degradation in paging performance inasmuch as the procedure is periodically interrupted to receive control data from the current cellular control channel and then returns to the interrupted operation.

We claim:

1. The method of operating a cellular mobile station to identify a suitable cellular control channel for entering a camping state with a highest priority cellular service provider, based on data stored in the cellular mobile station, that is preferred to a current cellular control channel the mobile station is camping on, comprising the steps of:

(a) measuring received signal strength of a plurality of available cellular control channels;

(b) attempting to lock onto the available cellular control channels having highest signal strength;

(c) determine if a locked onto cellular control channel is a highest priority cellular control channel, and if so, then camping on that cellular control channel, and otherwise returning to camping on the current control channel; and (d) periodically interrupting any of steps (a)–(c) to receive control data from the current cellular control channel and then returning to the interrupted step.

2. The method of claim 1 wherein step (d) includes the step of calculating available time T until control data will next be received, upon returning to the interrupted step.

3. The method of claim 2 wherein each of steps (a)–(c) continues until available time T has been reached and then interrupts or until the respective step is completed.

4. The method of claim 2 wherein the interrupting step comprises determining how many of the available control channels can be measured in the available time T and measuring the received signal strength for the determined number of control channels.

5. The method of claim 2 wherein the interrupting step comprises determining how much time T2 is available to attempt to lock onto a cellular control channel and attempting to lock onto the highest signal strength cellular control channel for the time T2.

6. The method of claim 2 wherein the interrupting step comprises determining how much time T3 is available to determine if a locked onto cellular control channel is a highest priority cellular control channel and reading overhead information on the locked onto cellular control channel for that time T3.

7. The method of claim 1 wherein normal cellular control activities are defined by a hyperframe of a select time period and the control data is received during a select portion of the time period, wherein steps(a)–(c) are interrupted prior to the select portion of the time period.

8. In a cellular mobile station having a processor operable to identify a suitable cellular control channel for entering a camping state with a highest priority cellular service provider, based on data stored in the cellular mobile station, that is preferred to a current cellular control channel the mobile station is camping on, an intelligent roaming program comprising:

means for measuring received signal strength of a plurality of available cellular control channels;

means for attempting to lock onto the available cellular control channels having highest signal strength;

means for determining if a locked onto cellular control channel is a highest priority cellular control channel, and if so, then camping on that cellular control channel, and otherwise returning to camping on the current control channel; and interrupt means for periodically interrupting operation of any of the measuring means, the attempting means or the determining means to receive control data from the current cellular control channel and then returning to the interrupted operation.

9. The intelligent roaming program of claim 8 wherein the interrupt means includes means for calculating available time T until control data will next be received, upon returning to the interrupted operation.

10. The intelligent roaming program of claim 9 wherein each operation continues until available time T has been reached and then interrupts or until the respective operation is completed.

11. The intelligent roaming program of claim 9 wherein the interrupting means comprises determining how many of the available control channels can be measured in the available time T and measuring the received signal strength for the determined number of control channels.

12. The intelligent roaming program of claim 9 wherein the interrupting means comprises determining how much time T2 is available to attempt to lock onto a cellular control channel and attempting to lock onto the highest signal strength cellular control channel for the time T2.

13. The intelligent roaming program of claim 9 wherein the interrupting means comprises determining how much time T3 is available to determine if a locked onto cellular control channel is a highest priority cellular control channel and reading overhead information on the locked onto cellular control channel for that time T3.

14. The intelligent roaming program of claim 8 wherein normal cellular control activities are defined by a hyperframe of a select time period and the control data is received during a select portion of the time period, wherein operation is interrupted prior to the select portion of the time period.

* * * * *